United States Patent [19] [11] 4,328,320
Reszniak et al. [45] May 4, 1982

[54] THERMOPLASTIC CONSTRUCTIONAL-AND-INSULATING MATERIAL

[76] Inventors: Waldemar B. Reszniak; Larisa Smirnowa, both of ul.Kołobrzeska 23/50, Olsztyn, Poland

[21] Appl. No.: 148,673

[22] Filed: May 12, 1980

[51] Int. Cl.$^3$ ................................................. C08J 9/00
[52] U.S. Cl. ...................................... 521/84; 521/54; 521/91; 521/143; 523/218; 524/13
[58] Field of Search ...................... 521/54, 84, 91, 143

[56] References Cited

U.S. PATENT DOCUMENTS

| | | | |
|---|---|---|---|
| 3,884,844 | 5/1975 | Plimguian et al. | 521/182 |
| 3,917,547 | 11/1975 | Massey | 521/54 |
| 3,962,157 | 6/1976 | Nakano et al. | 521/84 |
| 4,243,575 | 1/1981 | Myers et al. | 521/54 |

*Primary Examiner*—Morton Foelak

[57] ABSTRACT

The subject of the invention is a new thermoplastic constructional-and-insulating building material based upon fly-ashes being a waste material at combusting coal.

It is composed of fly-ashes in amount of 50-80% by weight, organic porofores, for instance in form of azodicarbamide, in amount of 0.05-5% by weight, or of playing the part of porofores sawdust or wood chips having the moisture content of about 50%, in amount of 10-30% by weight, and of polypropylene in amount of 8-40% by weight.

Said material shows a porous structure with sealed pores. It is featured by high mechanical strength, abrasion resistance and non-absorptivity. Thereof insulating wall and floor linings can be manufactured, as well as roofing for the agricultural and industrial building and for housing.

The use of said material causes a utilization of industrial wastes lying on dumps around power plants and sawmills contributing thus to a significant reduction of pollution of the natural environment.

1 Claim, No Drawings

THERMOPLASTIC CONSTRUCTIONAL-AND-INSULATING MATERIAL

This invention relates to a new thermoplastic constructional-and-insulating building material based upon fly-ashes being waste material produced by combusting ground coal, precipitated in electro-filters.

It is known the application of fly-ashes for production of a thermo-insulating building material, and namely of cellular concrete. (Directions and possibilities of application of fly-ashes in Poland. Warszawa 1977, pp. 42–54). For production of cellular concrete they are employed mainly as aggregate, and partially as binding material in those production processes wherein the common grinding of aggregates with a portion of binding material (common grinding of a portion of fly-ashes with lime and cement, or with lime) is provided.

The thermoplastic constructional-and-insulating building material according to the invention consists in its substantial part of fly-ashes, containing 50–80% by weight thereof. Another component therof are porophors. This can be organic porofors in form for instance of azodicarbamide, being added in amount of 0.05–5% by weight, or sawdust or wood chips having a moisture content of about 50%, in amount of 10–30% by weight, which play part of porofores. A binding agent for the entire material is polypropylene in amount of 8–40% by weight.

The material according to the invention shows a porous structure with closed pores. It is featured by good dielectric properties, high mechanical strength, high abrasion resistance and non-absorbability, and by good flowability in course of moulding. It shows good machineability. It can be employed in agricultural and industrial building, as well as in housing. Thereof insulating wall and floor linings can be produced. It can be also used for roofings.

The utilization of raw materials whereof the building material according to the invention is composed solves to a wide extent the utilization of industrial wastes lying useless the dumps around power plants and sawmills, contributing thus to a reduction of natural environment pollution.

The thermoplastic constructional-and-insulating material according to the invention will be now presented with more particulars by means of examples of the realization:

EXAMPLE I

| Fly-ashes | 58% by weight |
|---|---|
| Azodicarbamide | 2% by weight |
| Polypropylene | 40% by weight |

Fly-ashes are connected with polypropylene by the way of mixing at the temperature of 160°–200° C. The obtained plastic compound is supplied onto heating rolls where in course of rolling azodicarbamide is added. In course of rolling gas bubbles are produced within the material, which in plastic thick compound remains in form of pores. From the rolls the compound is supplied to an extruder giving thereto the desired form.

EXAMPLE II

| Fly-ashes | 50% by weight |
|---|---|
| Sawdust with moisture content of 50% | 30% by weight |
| Polypropylene | 20% by weight. |

Fly-ashes are connected with polypropylene by the way of mixing at the temperature of 160°–200° C. The obtained plastic compound is supplied onto heating rolls where in course of rolling wet sawdust is added. In course of rolling bubbles are produced remaining for good in the plastic thick compound. From the rolls the material is supplied to an extruder and moulded into the desired form.

EXAMPLE III

| Fly-ashes | 80% by weight |
|---|---|
| Wood chips with moisture content of 50% | 12% by weight |
| Polypropylene | 8% by weight |

Fly-ashes are connected with polypropylene by the way of mixing at the temperature of 160°–200° C. The obtained plastic compound is supplied onto heating rolls where in course of rolling wet wood chips are added. In course of evaporation of water from the wet chips bubbles are produced, remaining for good, in form of pores, in the plastic thick compound. From the rollers the material is supplied to moulding.

What is claimed is:

1. A thermoplastic construction-insulating building material comprising from about 50 to 80% by weight of fly-ashes, from about 10 to 30% by weight of a porous material selected from the group consisting of sawdust and wood chips having a moisture content of about 50%, and as a binder, from about 8 to 40% of polypropylene.

* * * * *